US009854358B2

(12) United States Patent
Paranjpe (10) Patent No.: US 9,854,358 B2
(45) Date of Patent: Dec. 26, 2017

(54) SYSTEM AND METHOD FOR MITIGATING AUDIO FEEDBACK

(71) Applicant: 2236008 Ontario Inc., Waterloo (CA)

(72) Inventor: Shreyas Anand Paranjpe, Vancouver (CA)

(73) Assignee: 2236008 Ontario Inc., Waterloo, Ontario (CA)

( * ) Notice: Subject to any disclaimer, the term of this patent is extended or adjusted under 35 U.S.C. 154(b) by 216 days.

(21) Appl. No.: 14/807,441

(22) Filed: Jul. 23, 2015

(65) Prior Publication Data

US 2016/0029124 A1     Jan. 28, 2016

Related U.S. Application Data

(60) Provisional application No. 62/029,190, filed on Jul. 25, 2014.

(51) Int. Cl.
*H04R 3/02* (2006.01)
*G10K 11/178* (2006.01)
*G10L 21/0232* (2013.01)

(52) U.S. Cl.
CPC ............ *H04R 3/02* (2013.01); *G10K 11/178* (2013.01); *G10L 21/0232* (2013.01); *G10K 2210/108* (2013.01); *G10K 2210/1282* (2013.01); *G10K 2210/3025* (2013.01); *G10K 2210/505* (2013.01); *G10K 2210/506* (2013.01); *H04R 2227/009* (2013.01); *H04R 2499/13* (2013.01)

(58) Field of Classification Search
None
See application file for complete search history.

(56) References Cited

U.S. PATENT DOCUMENTS 5,677,987 A   10/1997  Seki et al.
5,717,772 A    2/1998  Lane et al.
(Continued)

FOREIGN PATENT DOCUMENTS

EP         1 404 148 A1    3/2004
WO    WO 2014/205297 A1   12/2014

OTHER PUBLICATIONS

European Search Report for corresponding European Application No. 15178142.4 dated Nov. 9, 2015, 12 pages.
(Continued)

*Primary Examiner* — Paul Huber
(74) *Attorney, Agent, or Firm* — Brinks Gilson & Lione (57) ABSTRACT

A system and method for mitigating audio feedback may calculate a smoothed frequency spectrum of an audio signal. Previously detected candidate feedback tones may be obtained. Candidate feedback tones may be determined responsive to a frequency spectrum of the audio signal, the smoothed frequency spectrum and the previously detected candidate feedback tones. One or more signal characteristics associated with the audio signal and feedback coefficients associated with the candidate feedback tones may be obtained. The feedback coefficients may be modified responsive to the one or more signal characteristics. Actionable feedback tones may be determined responsive to the associated feedback coefficients exceeding a respective feedback threshold. Feedback suppression coefficients associated with each of the determined actionable feedback tones may be generated and may be utilized to suppress the actionable feedback tones.

34 Claims, 6 Drawing Sheets

(56) References Cited

U.S. PATENT DOCUMENTS 7,133,529 B2 11/2006 Ura
8,634,575 B2 1/2014 Williams

OTHER PUBLICATIONS

Toon Van Waterschoot et al., "Adaptive Feedback Cancellation for the Audio Applications," Proceedings of the IEEE, vol. 89, No. 11, Nov. 2009, pp. 2185-2201.
Toon van Waterschoot et al., "Fifty Years of Acoustic Feedback Control: State of the Art and Future Challenges," Proceedings of the IEEE, vol. 99, No. 2, Feb. 2011, pp. 288-327.

SYSTEM AND METHOD FOR MITIGATING AUDIO FEEDBACK

CROSS-REFERENCE TO RELATED APPLICATIONS

This application claims priority from U.S. Provisional Patent Application Ser. No. 62/029,190, filed Jul. 25, 2014, the entirety of which is incorporated herein by reference.

BACKGROUND

1. Technical Field

The present disclosure relates to the field of processing audio signals. In particular, to a system and method for mitigating audio feedback.

2. Related Art

In-car communication (ICC) systems may be integrated into an automobile cabin to facilitate communication between occupants of the vehicle by relaying signals captured by microphones and reproducing them in audio transducers within the vehicle. For example, a microphone near the driver's mouth is fed to an audio transducer near the third row to allow third row occupants to hear the driver's voice clearly. Delay and relative level between the direct arrival and reproduced sound of a particular talker at a listener's location is important to ensure the naturalness of conversation. Reproducing the drivers voice may result in a feedback path that may cause ringing, so attention must be paid to keep the closed-loop gain at a safe level. In many cases, paying close attention to the closed-loop gain may not be enough to prevent ringing caused by the feedback path.

BRIEF DESCRIPTION OF DRAWINGS

The system and method may be better understood with reference to the following drawings and description. The components in the figures are not necessarily to scale, emphasis instead being placed upon illustrating the principles of the disclosure. Moreover, in the figures, like referenced numerals designate corresponding parts throughout the different views.

Other systems, methods, features and advantages will be, or will become, apparent to one with skill in the art upon examination of the following figures and detailed description. It is intended that all such additional systems, methods, features and advantages be included with this description and be protected by the following claims.

DETAILED DESCRIPTION

A system and method for mitigating audio feedback may calculate a smoothed frequency spectrum of an audio signal. Previously detected candidate feedback tones may be obtained. Candidate feedback tones may be determined responsive to a frequency spectrum of the audio signal, the smoothed frequency spectrum and the previously detected candidate feedback tones. One or more signal characteristics associated with the audio signal and feedback coefficients associated with the candidate feedback tones may be obtained or generated. The feedback coefficients may be modified responsive to the one or more signal characteristics. Actionable feedback tones may be determined responsive to the associated feedback coefficients exceeding a respective feedback threshold.

Figure 1:
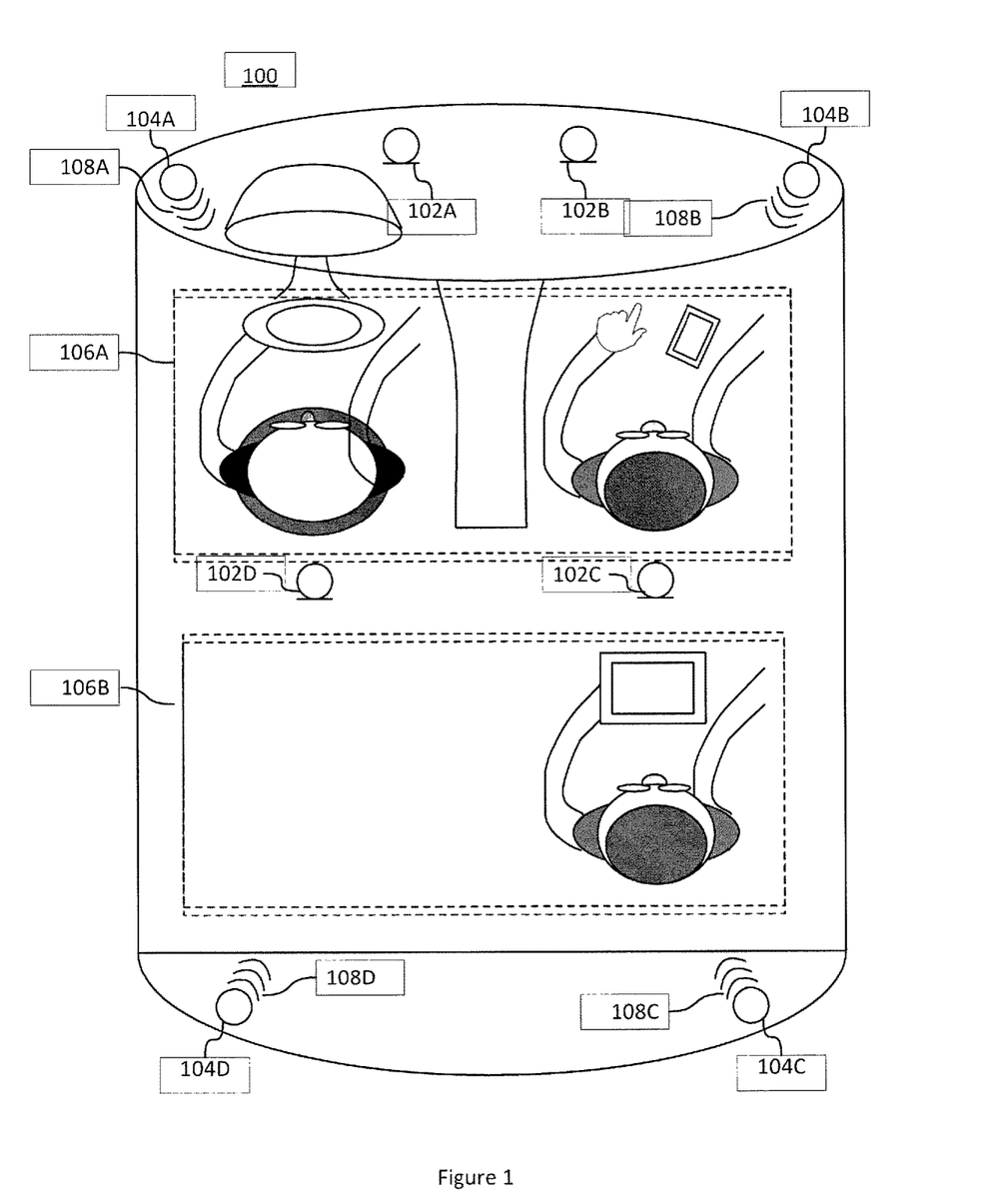
FIG. 1 is a schematic representation of an overhead view of an automobile in which a system for mitigating audio feedback may be used.

FIG. 1 is a schematic representation of an overhead view of an automobile in which a system for mitigating audio feedback is used. The example automobile cabin 100 may include multiple audio transducers 104A, 104B, 104C and 104D (collectively or generically audio transducers 104) and multiple microphones 102A, 102B, 102C and 102D (collectively or generically microphones 102). One or more of the audio transducers 104 emit audio signals 108A, 108B, 108C and 108D (collectively or generically audio signals 108) that may be captured by one or more of the microphones 102. The captured audio signals using the one or more microphones 102 may include, for example, voices from users in the automobile cabin 100, the audio signals 108, time-delayed and reverberant energy associated audio signals 108, music from an integrated entertainment system, alerts associated with vehicle functionality and many different types of noise. The automobile cabin 100 may include a front seat zone 106A and a rear seat passengers' zone 106B (collectively or generically the zones 106). Other zone configurations are possible that may include a driver's zone, a front passenger zone and a third row rear seat passengers' zone (not shown).

An in-car communication (ICC) system may be integrated into or a unitary part of the automobile cabin 100 that facilitates communication between occupants of the vehicle by relaying signals captured by the microphone 102 and reproducing them in the audio transducers 104 within the vehicle. For example, a microphone near the driver's mouth is fed to an audio transducer near the third row to allow third row occupants to hear the driver's voice clearly. The ICC system may improve the audio quality associated with a user located in a first zone communicating with a user located in a second zone. Reproducing the drivers voice may result in a feedback path that may cause ringing, so attention must be paid to keep the closed-loop gain at a safe or stable operating level. Delay and relative level between the direct arrival and reproduced sound of a particular talker at a listener's location is also important to ensure the naturalness of conversation. The ICC system may also act as a sound reinforcement system for use, for example, in large conference rooms with speakerphones and audio performances such as concert halls.

Figure 2:
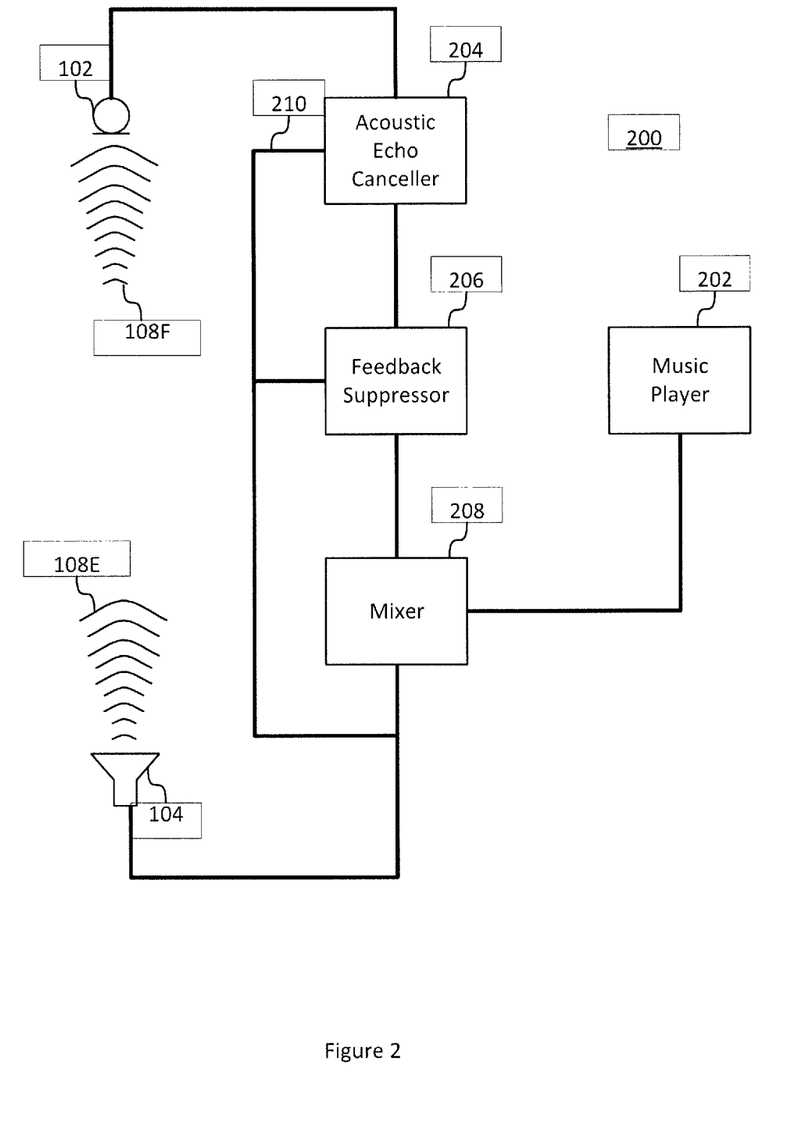
FIG. 2 is a schematic representation of a system for mitigating audio feedback.

FIG. 2 is a schematic representation of a system for mitigating audio feedback 200. The system 200 is an example system configuration for use in a vehicle. The example system configuration includes a music player 202, an acoustic echo canceller (AEC) module 204, a feedback suppressor module 206, and a mixer module 208. The music player 202 may produce audio from, for example, any one or more of a compact disc (CD), AM/FM/Digital radio, infotainment unit, and vehicle chimes. The AEC module 204 in conjunction with the feedback suppressor module 206 may provide some or all of the functionality described above associated with an ICC system. The AEC module 204 for voice processing measures or estimates the echo path between the audio transducers 104 and microphones 102 and cancels some or all of the echo of the talker in a signal captured by the microphone. The feedback suppressor module 206 mitigates audio feedback between the audio transducer 104 and microphone 102. The audio signal captured by the microphone 102 may be processed utilizing the AEC module 204 and the feedback suppressor module 206 where the result may be mixed with the output of the music player 202 utilizing the mixer module 208. In one alternative, the audio signal captured by the microphone 102 may be processed with other audio processing modules before the AEC module 204 and the feedback suppressor module 206. While FIG. 2 illustrates only a single microphone 102 and a single audio transducer 104 for simplicity of presentation, the principles and operation described here in also apply to the use of two or more microphones 102 and/or two or more audio transducers 104.

The audio transducer 104 may reproduce the audio signal 108E into the vehicle cabin 100. The microphone 102 may capture the audio signal 108F that may include any one or more of the audio signal 108E, time-delayed and reverberant energy associated audio signal 108E, audio from the music player 202, alerts and noise associated with vehicle cabin 100. A reference signal 210 may be utilized by the AEC module 204 and the feedback suppressor module 206 to help distinguish between the audio signal 108E reproduced in the audio transducer 104 and the additional signals introduced in the vehicle cabin 100 captured by the microphone 102.

Figure 3:
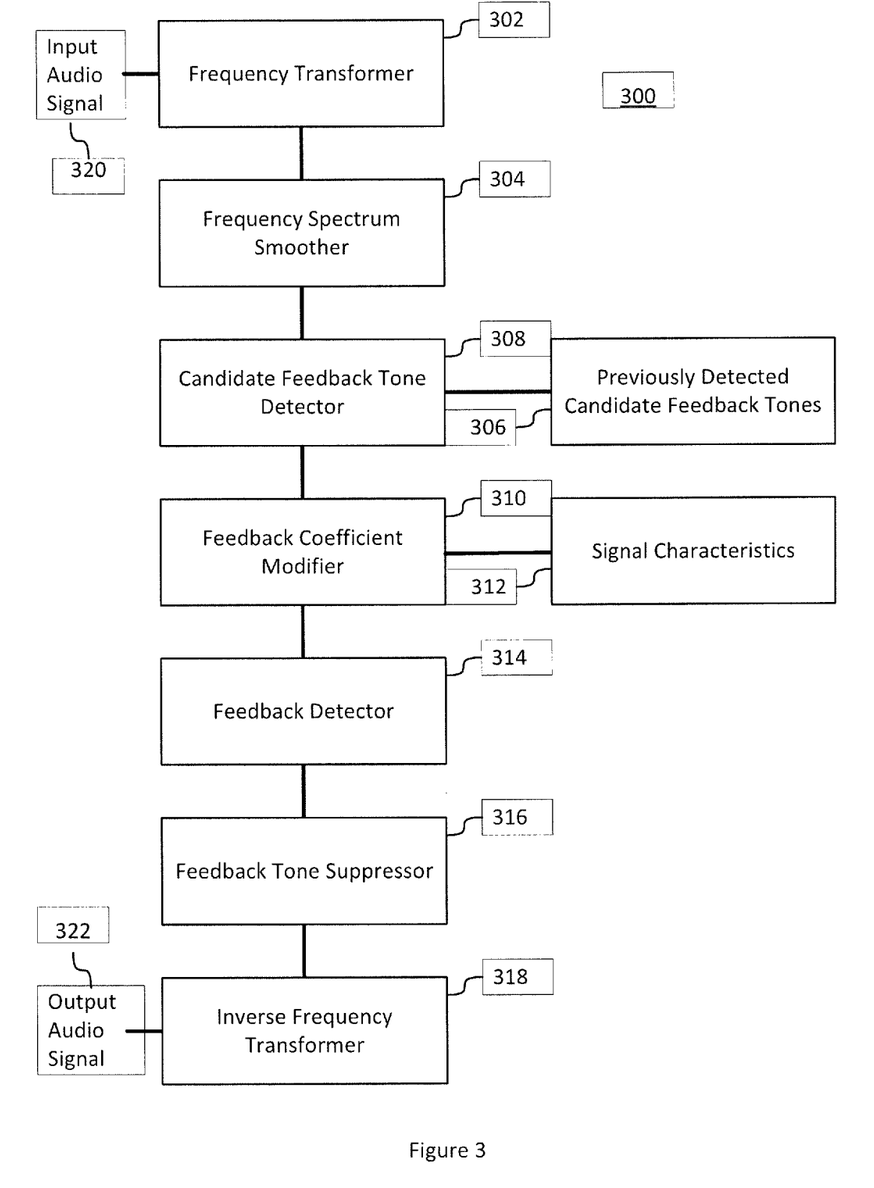
FIG. 3 is a further schematic representation of a system for mitigating audio feedback.

FIG. 3 is a further schematic representation of a system for mitigating audio feedback 300. The system 300 may be an example feedback suppressor module 206 for use in an ICC system. An input audio signal 320 may be, for example, the audio signal captured by the microphones 102 or the output of the AEC module 204. A subband filter, or frequency transformer 302, may process the input audio signal 320 to extract frequency information and perform a frequency analysis, of the input audio signal 320. The frequency transformer 302 may extract frequency information by one or more methods, such as, for example a Fast Fourier Transform (FFT). Alternatively, the frequency analysis in the frequency transformer 302 may include a time-based filterbank. The time-based filterbank may be a bank of overlapping bandpass filters. The frequency transformer 302 may also use a windowed add/overlap analysis. The frequency analysis may be performed repeatedly over time (e.g., block by block or frame by frame). A frequency spectrum of the input audio signal 320 may be generated by the frequency transformer 302. The frequency spectrum may be, for example, equally spaced frequency bins.

A frequency spectrum smoother 304 may smooth the frequency spectrum across frequency bins to produce a smoothed frequency spectrum. The smoothed frequency spectrum may have reduced peaks, or tones, when compared to the frequency spectrum. Alternatively, the frequency spectrum may be smoothed across both frequency and time.

Feedback tones may occur as substantially stationary tones over time. Tonal frequency components of speech signals may change rapidly over time. A candidate feedback tone detector 308 may detect the feedback tones and ignore speech components. The candidate feedback tone detector 308 may determine candidate feedback tones responsive to the frequency spectrum, the smoothed frequency spectrum and previously detected candidate feedback tones 306. Spectral peaks, or frequency components in the frequency spectrum that may be above the smoothed frequency spectrum, whose magnitude may be close to the previously detected candidate feedback tones 306 may be candidate feedback tones. A threshold may be used to determine whether the magnitude of the spectral peak is close to the magnitude of the previously detected candidate feedback tone. The magnitude of the frequency bins detected as the candidate feedback tones may be stored as previously detected candidate feedback tones 306. Spectral peaks may be detected by examining the difference between the frequency spectrum and the smoothed frequency spectrum. The spectral peaks associated with potential feedback tones may be detected by examining the previously identified spectral peaks, or previously detected candidate feedback tones 306, to determine if the spectral peaks are similar in frequency and magnitude. Tonal speech components may not have similar spectral peaks in frequency and magnitude over time. The reference signal 210 may be utilized to mitigate false feedback tone detection for tonal components in music that may have spectral peaks that remain substantially stationary in frequency and magnitude over time. Candidate feedback counters may count the number of consecutive frames that the same frequency component has been detected as a candidate feedback tone. The candidate feedback counters may be stored in memory similarly to the previously detected candidate feedback tones 306.

The candidate feedback tones may be analyzed to further distinguish between speech, music and non-feedback noise utilizing a feedback coefficient modifier 310. The feedback coefficient modifier 310 may calculate feedback coefficients, or feedback weights. Each candidate feedback tone may have an associated feedback coefficient. The feedback coefficients associated with the candidate feedback tones may be stored and retrieved, or obtained, between each successive frequency transform. The feedback coefficients may be modified, for example, in a proportional or inversely proportional relationship as determined by the calculations in feedback coefficient modifier 310. Signal characteristics 312 may be utilized by the feedback coefficient modifier 310 to modify the feedback coefficients. The signal characteristics 312 may include, for example, a background noise estimate, a signal to noise ratio (SNR) and the output of a voice activity detector (VAD). The feedback coefficients may be modified based on one or more calculations performed by the feedback coefficient modifier 310. In one example, the feedback coefficients associated with the candidate feedback tones may be modified to indicate that the candidate feedback tones may require less suppression when the associated SNR is low. Feedback tones with low SNR may be less perceptible. In another example, the feedback coefficients may be modified to indicate that the candidate feedback tones may require less suppression when the candidate feedback tones are closely spaced in frequency. Candidate feedback tones that are closely spaced in frequency may be more likely to be speech or music signals. Feedback tones may be more likely to be frequency isolated tones. Additionally, feedback tones may be less likely to be harmonically related to the reference signal 210. Candidate feedback tones harmonically related to the reference signal content may have the associated feedback coefficients modified to indicate that the candidate feedback tones may require less suppression. Candidate feedback tones that have associated candidate feedback counters that exceed a threshold may have the feedback coefficients modified to indicate that the candidate feedback tones require more suppression. An increasing candidate feedback counter may indicate an increasing probability of feedback as feedback tones tend to be consistent over time.

A feedback detector 314 may determine actionable feedback tones responsive to the associated feedback coefficients exceeding a respective feedback threshold. The feedback threshold may be, for example, the same value for each frequency, increase or decrease across frequency or a set of specific values determined from a priori knowledge. For example, the distance between the microphones 102 and audio transducers 104 may increase the probability of feedback tones at specific frequencies. The a priori knowledge may increase the mitigation of higher probability feedback tones. The feedback detector 314 may generate feedback suppression coefficients that may be utilized to suppress the actionable feedback tones.

A feedback tone suppressor 316 may modify the frequency spectrum responsive to the feedback suppression coefficients. The feedback tone suppressor 316 may modify the magnitude of the frequency spectrum to mitigate the actionable feedback tones. The feedback tone suppressor 316 may randomize the phase of the identified actionable feedback tones to further reduce the perceptibility. The feedback tone suppressor 316 may modify the frequency spectrum in the frequency domain or the time domain. An inverse frequency transformer 318 may convert the modified frequency spectrum into a time domain output audio signal 322. The inverse frequency transformer 318 may provide the inverse functionality of the frequency transformer 302. The feedback suppression coefficients may be combined with other noise suppression coefficients from, for example, a background noise suppressor in order to reduce the computing complexity. The feedback coefficients and the feedback suppression coefficients may be smoothed over time and frequency.

In an alternative embodiment, the feedback tone suppressor 316 may apply the feedback suppression coefficients to the input audio signal 320 generating the output audio signal 322. The frequency spectrum smoother 304, the candidate feedback tone detector 308, the feedback coefficient modifier 310 and the feedback detector 314 may operate in the frequency domain while the signal path modifications operate in the time domain.

Figure 4:
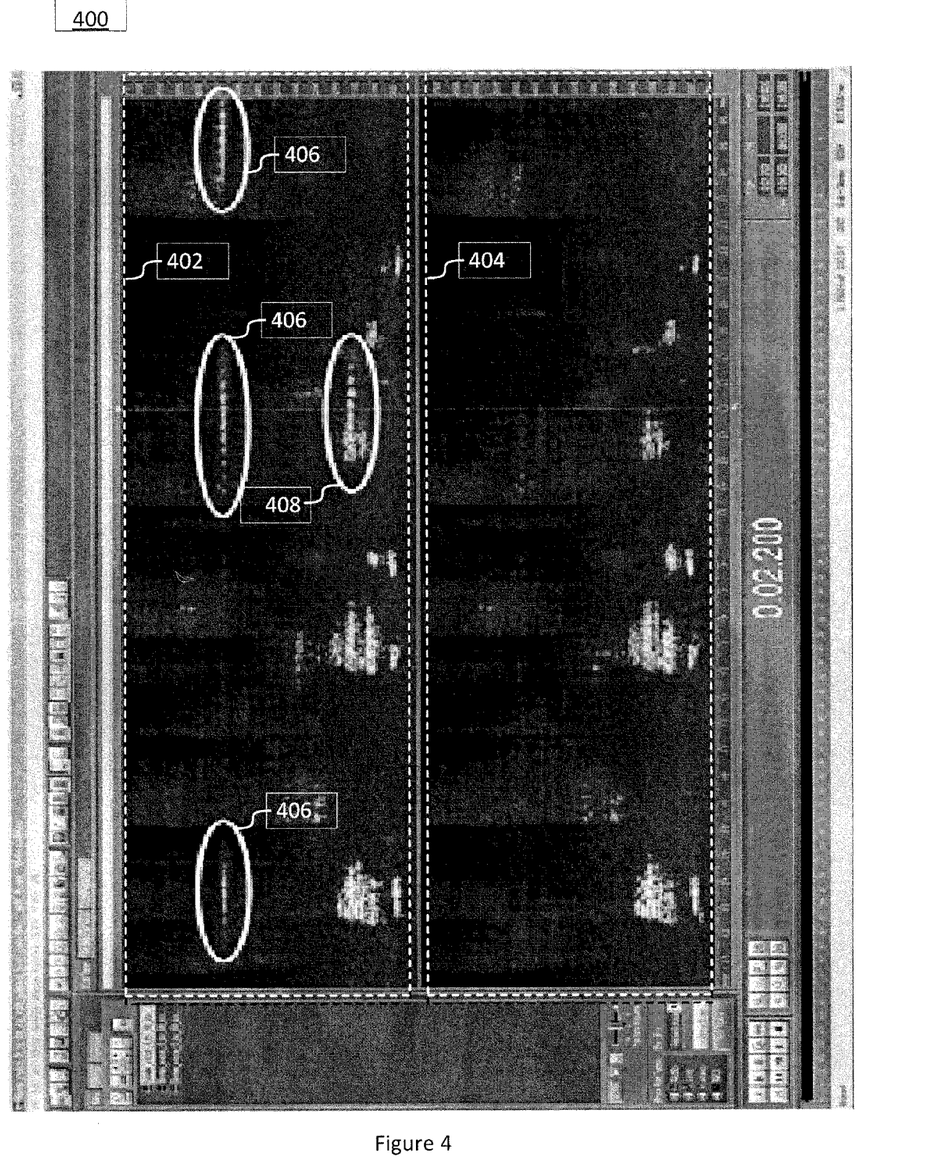
FIG. 4 is a representation of an input audio signal and an output audio signal after utilizing the system for mitigating audio feedback.

FIG. 4 is a representation of an input audio signal and an output audio signal after utilizing the system for mitigating audio feedback 400. FIG. 4 shows an example input audio signal 402 and an output audio signal 404 after applying the feedback suppressor 206. The input audio signal 402 and the output audio signal 404 plots frequency on the y-axis against time on the x-axis. The input audio signal 402 and the output audio signal 404 show a spectrogram where the brighter values indicate larger magnitude frequency components. The input audio signal 402 shows speech components, feedback tones 406 near 4900 Hz and feedback tones 408 near 1650 Hz. The output audio signal 404 shows the speech components where the feedback tones 406 and the ringing 408 have been mitigated utilizing the feedback suppressor 206.

Figure 5:
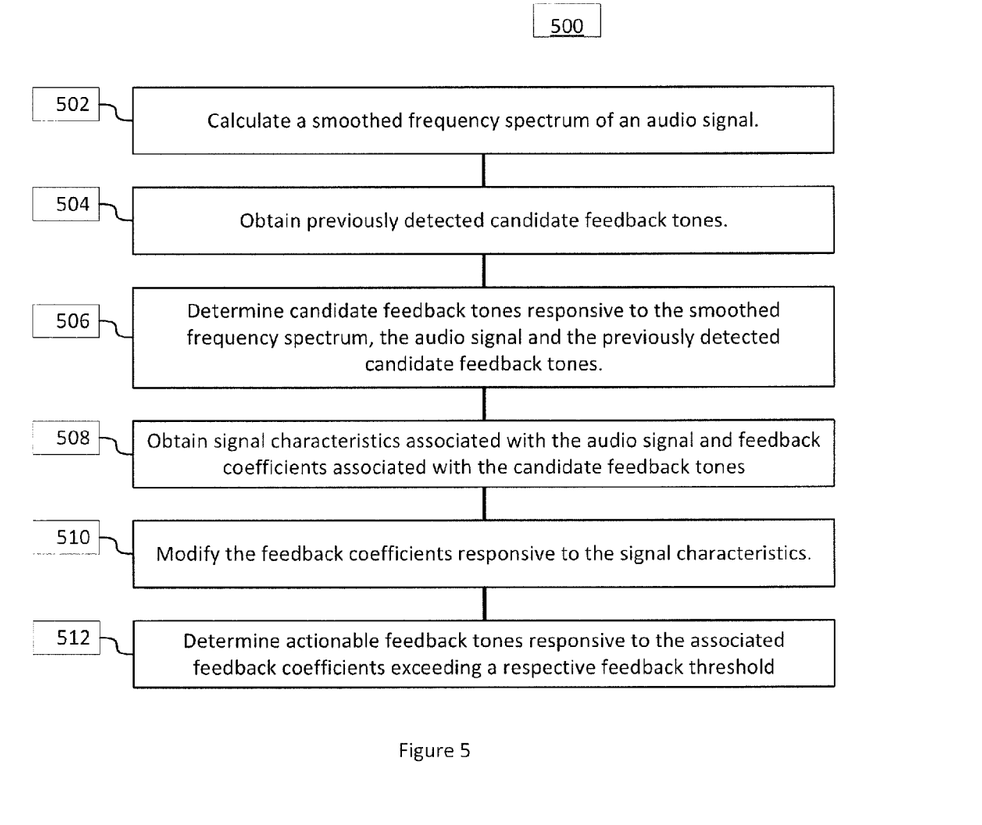
FIG. 5 is a representation of a method for mitigating audio feedback.

FIG. 5 is a representation of a method for mitigating audio feedback. The method 500 may be, for example, implemented using any of the systems 100, 200, 300 and 600 described herein with reference to FIGS. 1, 2, 3 and 6. The method 500 may calculate a smoothed frequency spectrum of an audio signal 502. Previously detected candidate feedback tones may be obtained 504. Candidate feedback tones may be determined responsive to a frequency spectrum of the audio signal, the smoothed frequency spectrum and the previously detected candidate feedback tones 506. One or more signal characteristics associated with the audio signal and feedback coefficients associated with the candidate feedback tones may be obtained 508. The feedback coefficients may be modified responsive to the one or more signal characteristics 510. Actionable feedback tones may be determined responsive to the associated feedback coefficients exceeding a respective feedback threshold 512. Feedback suppression coefficients associated with each of the determined actionable feedback tones may be generated and may be utilized to suppress the actionable feedback tones.

Figure 6:
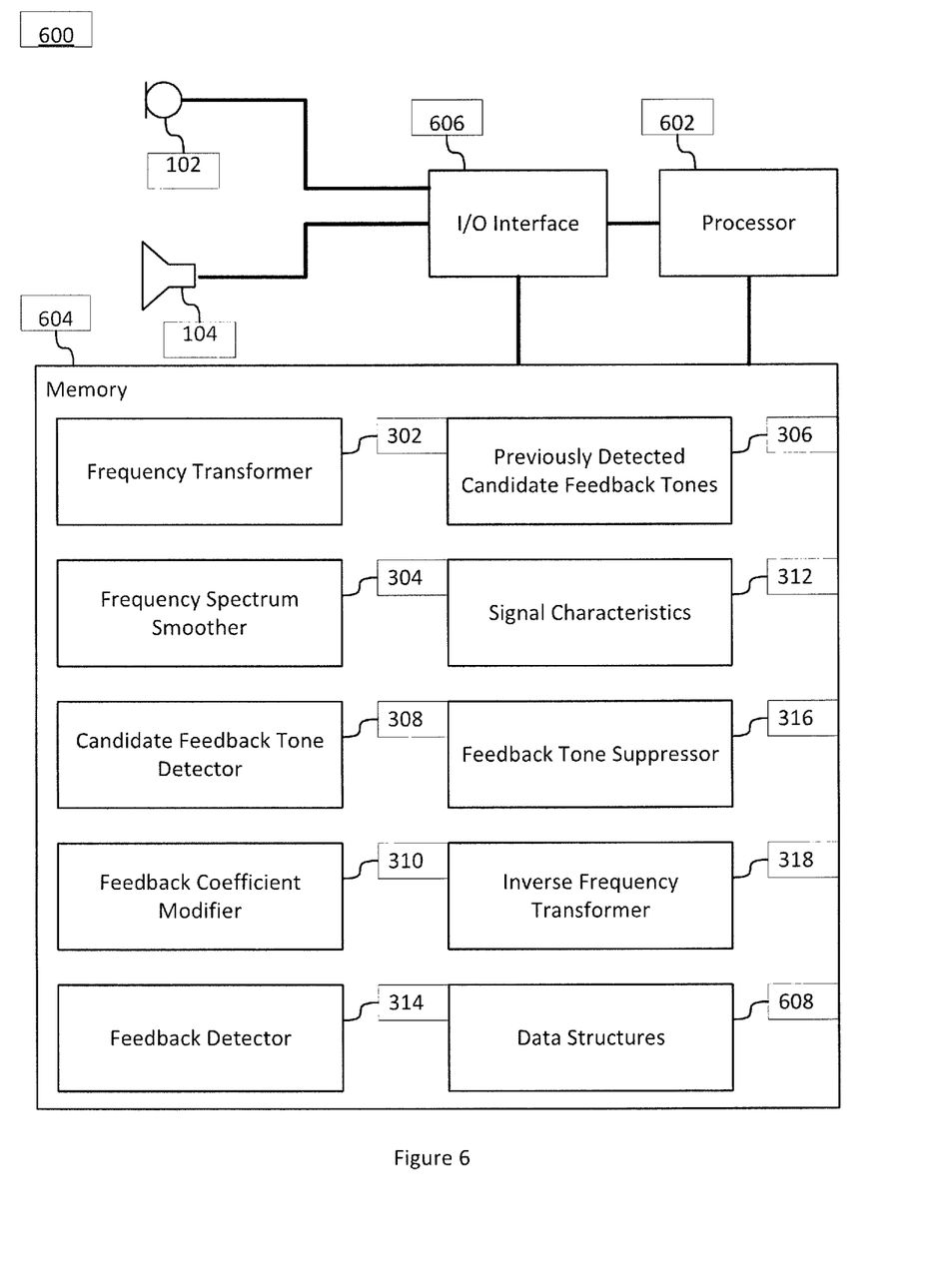
FIG. 6 is a further schematic representation of a system for mitigating audio feedback.

FIG. 6 is a further schematic representation of a system for mitigating audio feedback. The system 600 comprises a processor 602, memory 604 (the contents of which are accessible by the processor 602) and an I/O interface 606. The memory 604 may store instructions which when executed using the process 602 may cause the system 600 to render the functionality associated with mitigating audio feedback as described herein. For example, the memory 604 may store instructions which when executed using the processor 602 may cause the system 600 to render the functionality associated with the frequency transformer 302, the frequency spectrum smoother 304, the previously detected candidate feedback tones 306, the candidate feedback tone detector 308, the feedback coefficient modifier 310, the signal characteristics 312, the feedback detector 314, the feedback tone suppressor 316 and the inverse frequency transformer 318 as described herein. In addition, data structures, temporary variables and other information may store data in data storage 608.

The processor 602 may comprise a single processor or multiple processors that may be disposed on a single chip, on multiple devices or distributed over more that one system. The processor 602 may be hardware that executes computer executable instructions or computer code embodied in the memory 604 or in other memory to perform one or more features of the system. The processor 602 may include a general purpose processor, a central processing unit (CPU), a graphics processing unit (GPU), an application specific integrated circuit (ASIC), a digital signal processor (DSP), a field programmable gate array (FPGA), a digital circuit, an analog circuit, a microcontroller, any other type of processor, or any combination thereof.

The memory 604 may comprise a device for storing and retrieving data, processor executable instructions, or any combination thereof. The memory 604 may include non-volatile and/or volatile memory, such as a random access memory (RAM), a read-only memory (ROM), an erasable programmable read-only memory (EPROM), or a flash memory. The memory 604 may comprise a single device or multiple devices that may be disposed on one or more dedicated memory devices or on a processor or other similar device. Alternatively or in addition, the memory 804 may include an optical, magnetic (hard-drive) or any other form of data storage device.

The memory 604 may store computer code, such as the frequency transformer 302, the frequency spectrum smoother 304, the previously detected candidate feedback tones 306, the candidate feedback tone detector 308, the feedback coefficient modifier 310, the signal characteristics 312, the feedback detector 314, the feedback tone suppressor 316 and the inverse frequency transformer 318 as described herein. The computer code may include instructions executable with the processor 802. The computer code may be written in any computer language, such as C, C++, assembly language, channel program code, and/or any combination of computer languages. The memory 604 may store information in data structures including, for example, feedback coefficients.

The I/O interface 606 may be used to connect devices such as, for example, the microphones 102, the audio transducers 104, and to other components of the system 600.

All of the disclosure, regardless of the particular implementation described, is exemplary in nature, rather than limiting. The system 600 may include more, fewer, or different components than illustrated in FIG. 6. Furthermore, each one of the components of system 600 may include more, fewer, or different elements than is illustrated in FIG. 6. Flags, data, databases, tables, entities, and other data structures may be separately stored and managed, may be incorporated into a single memory or database, may be distributed, or may be logically and physically organized in many different ways. The components may operate independently or be part of a same program or hardware. The components may be resident on separate hardware, such as separate removable circuit boards, or share common hardware, such as a same memory and processor for implementing instructions from the memory. Programs may be parts of a single program, separate programs, or distributed across several memories and processors.

The functions, acts or tasks illustrated in the figures or described may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing, distributed processing, and/or any other type of processing. In one embodiment, the instructions are stored on a removable media device for reading by local or remote systems. In other embodiments, the logic or instructions are stored in a remote location for transfer through a computer network or over telephone lines. In yet other embodiments, the logic or instructions may be stored within a given computer such as, for example, a CPU.

The term "coupled" disclosed in this description may encompass both direct and indirect coupling. Thus, first and second parts are said to be coupled together when they directly contact one another, as well as when the first part couples to an intermediate part which couples either directly or via one or more additional intermediate parts to the second part. The term "substantially" or "about" may encompass a range that is largely, but not necessarily wholly, that which is specified. It encompasses all but a significant amount. In other words, the terms "substantially" or "about" means equal to the extent audio standards are applied. When devices are responsive to commands events, and/or requests, the actions and/or steps of the devices, such as the operations that devices are performing, necessarily occur as a direct or indirect result of the preceding commands, events, actions, and/or requests. In other words, the operations occur as a result of the preceding operations. A device that is responsive to another requires more than an action (i.e., the device's response to) merely follow another action.

While various embodiments of the system and method system and method for mitigating audio feedback, it will be apparent to those of ordinary skill in the art that many more embodiments and implementations are possible within the scope of the present invention. Accordingly, the invention is not to be restricted except in light of the attached claims and their equivalents.

The invention claimed is:

1. A method for mitigating audio feedback comprising:
   calculating a smoothed frequency spectrum of an audio signal;
   detecting candidate feedback tones responsive to a frequency spectrum of the audio signal, the smoothed frequency spectrum and previously detected candidate feedback tones;
   calculating one or more signal characteristics associated with the audio signal;
   calculating feedback coefficients associated with the candidate feedback tones responsive to the one or more signal characteristics; and
   determining actionable feedback tones responsive to the associated feedback coefficients exceeding a respective feedback threshold.

2. The method for mitigating audio feedback of claim 1, where the smoothed frequency spectrum is calculated utilizing frequency smoothing or frequency and time smoothing.

3. The method for mitigating audio feedback of claim 1, where the candidate feedback tones are frequency components in the frequency spectrum that are larger in magnitude relative to frequency components in the smoothed frequency spectrum and less than a magnitude threshold associated with the previously detected candidate feedback tones.

4. The method for mitigating audio feedback of claim 1, where the feedback coefficients are an amount of suppression applicable to each of the associated candidate feedback tones.

5. The method for mitigating audio feedback of claim 1, further comprising modifying actionable feedback tones by any one or more of: suppressing and randomizing a phase.

6. The method for mitigating audio feedback of claim 1, where the one or more signal characteristics include any one or more of: values in feedback counters, frequency components in a reference signal, a signal to noise ratio, an indication of voice activity, a background noise estimate and harmonically related tones.

7. The method for mitigating audio feedback of claim 6, where each feedback counter record the number of times a respective tone has been determined to be a candidate feedback tone where a higher count increases an amount of suppression associated with each of the respective feedback coefficients.

8. The method for mitigating audio feedback of claim 6, where tonal components detected in the reference signal reduce an amount of suppression associated with each of the respective feedback coefficients.

9. The method for mitigating audio feedback of claim 6, where candidate feedback tones harmonically related to the reference signal reduce an amount of suppression associated with each of the respective feedback coefficients.

10. The method for mitigating audio feedback of claim 6, where candidate feedback tones not harmonically related to the reference signal increase an amount of suppression associated with each of the respective feedback coefficients.

11. The method for mitigating audio feedback of claim 6, where a low signal to noise ratio reduces an amount of suppression associated with each of the respective feedback coefficients.

12. The method for mitigating audio feedback of claim 1, further comprising increasing an amount of suppression associated with each of the feedback coefficients at specific frequencies related to the distance between a microphone and audio transducer.

13. The method for mitigating audio feedback of claim 1, further comprising reducing an amount of suppression associated with each of the feedback coefficients with increasing frequency.

14. A system for mitigating audio feedback comprising:
a frequency spectrum smoother to calculate a smoothed frequency spectrum of an audio signal;
a candidate feedback tone detector to detect candidate feedback tones responsive to a frequency spectrum of the audio signal, the smoothed frequency spectrum and previously detected candidate feedback tones;
a signal characteristic calculator to calculate one or more signal characteristics associated with the audio signal;
a feedback coefficient calculator to calculate feedback coefficients associated with the candidate feedback tones responsive to the one or more signal characteristics; and
a feedback detector to determine actionable feedback tones responsive to the associated feedback coefficients exceeding a respective feedback threshold.

15. The system for mitigating audio feedback of claim 14, where the smoothed frequency spectrum is calculated utilizing frequency smoothing or frequency and time smoothing.

16. The system for mitigating audio feedback of claim 14, where the candidate feedback tones are frequency components in the frequency spectrum that are larger in magnitude relative to frequency components in the smoothed frequency spectrum and less than a magnitude threshold associated with the previously detected candidate feedback tones.

17. The system for mitigating audio feedback of claim 14, where the feedback coefficients are an amount of suppression applicable to each of the associated candidate feedback tones.

18. The system for mitigating audio feedback of claim 14, further comprising modifying actionable feedback tones by any one or more of: suppressing and randomizing a phase.

19. The system for mitigating audio feedback of claim 14, where the one or more signal characteristics include any one or more of: values in feedback counters, frequency components in a reference signal, a signal to noise ratio, an indication of voice activity, a background noise estimate and harmonically related tones;
where each feedback counter record the number of times a respective tone has been determined to be a candidate feedback tone where a higher count increases the amount of suppression associated with each of the respective feedback coefficients;
where tonal components detected in the reference signal reduce an amount of suppression associated with each of the respective feedback coefficients;
where candidate feedback tones harmonically related to the reference signal reduce the amount of suppression associated with each of the respective feedback coefficients;
where candidate feedback tones not harmonically related to the reference signal increase the amount of suppression associated with each of the respective feedback coefficients; and
where a low signal to noise ratio reduces the amount of suppression associated with each of the respective feedback coefficients.

20. The system for mitigating audio feedback of claim 14, further comprising increasing an amount of suppression associated with each of the feedback coefficients at specific frequencies related to the distance between a microphone and audio transducer.

21. A non-transitory machine-readable medium encoded with machine-executable instructions, where execution of the machine-executable instructions is for:
calculating a smoothed frequency spectrum of an audio signal;
detecting candidate feedback tones responsive to a frequency spectrum of the audio signal, the smoothed frequency spectrum and previously detected candidate feedback tones;
calculating one or more signal characteristics associated with the audio signal;
calculating feedback coefficients associated with the candidate feedback tones responsive to the one or more signal characteristics; and
determining actionable feedback tones responsive to the associated feedback coefficients exceeding a respective feedback threshold.

22. The non-transitory machine-readable medium of claim 21, where the smoothed frequency spectrum is calculated utilizing frequency smoothing or frequency and time smoothing.

23. The non-transitory machine-readable medium of claim 21, where the candidate feedback tones are frequency components in the frequency spectrum that are larger in magnitude relative to frequency components in the smoothed frequency spectrum and less than a magnitude threshold associated with the previously detected candidate feedback tones.

24. The non-transitory machine-readable medium of claim 21, where the feedback coefficients are an amount of suppression applicable to each of the associated candidate feedback tones.

25. The non-transitory machine-readable medium of claim 21, where execution of the machine-executable instructions is for modifying actionable feedback tones by any one or more of: suppressing and randomizing a phase.

26. The non-transitory machine-readable medium of claim 21, where the one or more signal characteristics include any one or more of: values in feedback counters, frequency components in a reference signal, a signal to noise ratio, an indication of voice activity, a background noise estimate and harmonically related tones.

27. The non-transitory machine-readable medium of claim 26, where each feedback counter record the number of times a respective tone has been determined to be a candidate feedback tone where a higher count increases an amount of suppression associated with each of the respective feedback coefficients.

28. The non-transitory machine-readable medium of claim 26, where tonal components detected in the reference signal reduce an amount of suppression associated with each of the respective feedback coefficients.

29. The non-transitory machine-readable medium of claim 26, where candidate feedback tones harmonically related to the reference signal reduce an amount of suppression associated with each of the respective feedback coefficients.

30. The non-transitory machine-readable medium of claim 26, where candidate feedback tones not harmonically related to the reference signal increase an amount of suppression associated with each of the respective feedback coefficients.

31. The non-transitory machine-readable medium of claim 26, where a low signal to noise ratio reduces an amount of suppression associated with each of the respective feedback coefficients.

32. The non-transitory machine-readable medium of claim 21, where execution of the machine-executable instructions is for increasing an amount of suppression associated with each of the feedback coefficients at specific frequencies related to the distance between a microphone and audio transducer.

33. The non-transitory machine-readable medium of claim 21, where execution of the machine-executable instructions is for reducing an amount of suppression associated with each of the feedback coefficients with increasing frequency.

34. A system for mitigating audio feedback in a vehicle comprising:
- a frequency spectrum smoother to calculate a smoothed frequency spectrum of an audio signal in the vehicle;
- a candidate feedback tone detector to detect candidate feedback tones responsive to a frequency spectrum of the audio signal, the smoothed frequency spectrum and previously detected candidate feedback tones in the vehicle;
- a signal characteristic calculator to calculate one or more signal characteristics associated with the audio signal in the vehicle;
- a feedback coefficient calculator to calculate feedback coefficients associated with the candidate feedback tones responsive to the one or more signal characteristics in the vehicle; and
- a feedback detector to determine actionable feedback tones responsive to the associated feedback coefficients exceeding a respective feedback threshold in the vehicle.

* * * * *